Patented Sept. 26, 1950

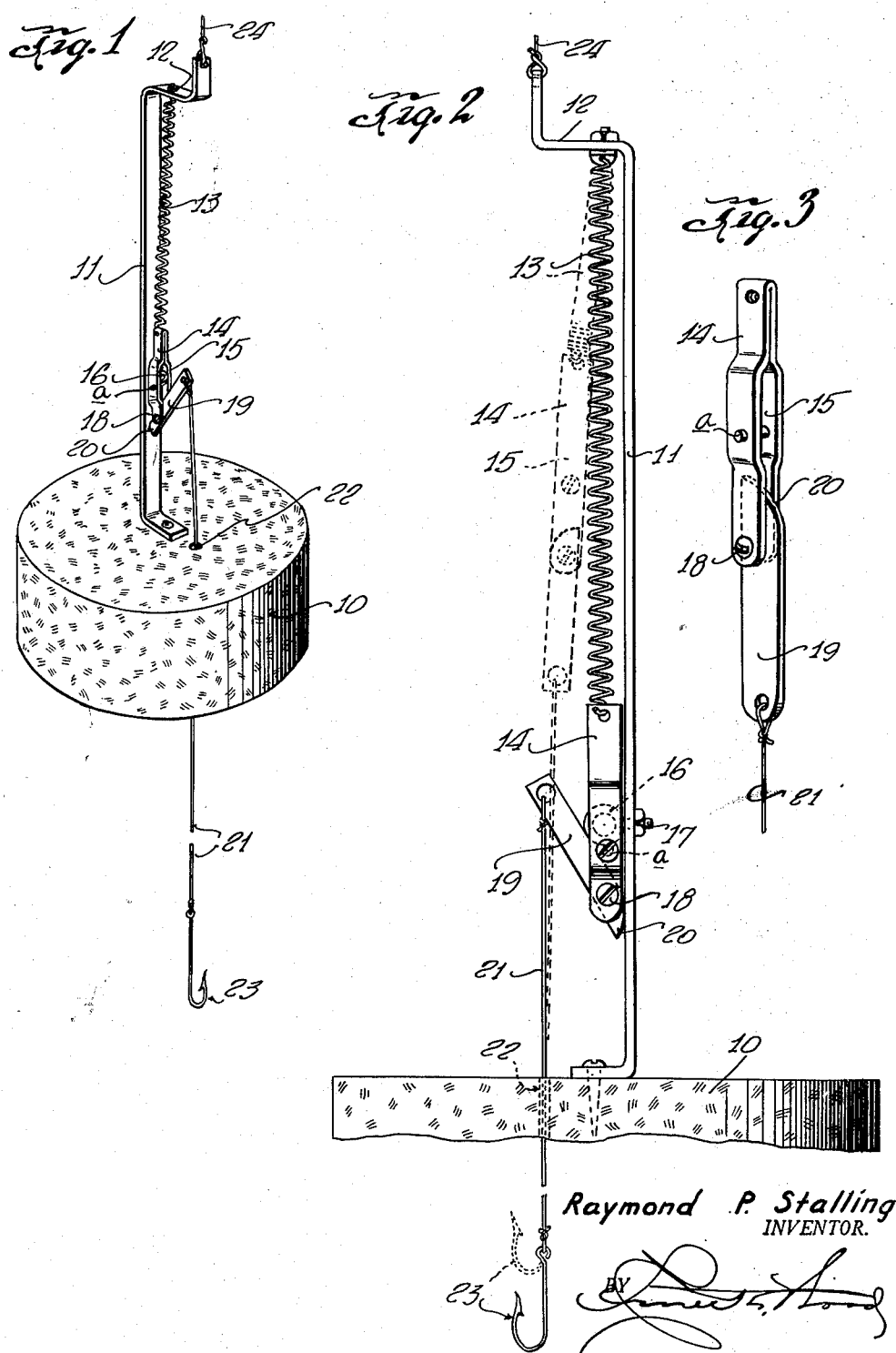

2,523,927

UNITED STATES PATENT OFFICE 2,523,927

FISHLINE JERKING DEVICE

Raymond P. Stallings, Dallas, Tex.

Application August 7, 1948, Serial No. 43,116

2 Claims. (Cl. 43—15)

This invention relates to fishing equipment and more particularly to automatically operated jerk lines.

The principal object of the invention is to improve upon conventional devices for jerking a fishing line, by disposing the line jerking mechanism and its tensioning means above instead of below the surface of the water and is supported upon rather than suspended from a float. The purpose in so arranging the line jerking mechanism is to facilitate its release to exert a quick pull upon the hook line when the bait is taken by a fish and to avoid resistance to the necessarily rapid operation which will occur if the device is required to function while submerged in water.

Another object of the invention is to provide an automatic jerking mechanism for fishing lines so constructed and arranged as to obviate the common tendency of the jerking mechanism in conventional devices to exert a downward pull on the float instead of the expected upward pull on the hook line, which tendency is due partially to the resistance of water in which the mechanism is submerged but chiefly to the fact that the buoyancy of the float is overcome by the initial movement of the line and the setting of the hook in the fish's mouth, a disadvantage which is partially if not completely obviated by disposing the line jerking mechanism above the float.

Still another object of the invention is to provide a fish line jerking device which may be connected with other identical devices on a common line for group fishing.

With the foregoing objects in view, the invention has further reference to certain features of accomplishment which will become apparent as the description proceeds, taken in connection with the accompanying drawings wherein:

Figure 1 is a perspective view of a fish line jerking device constructed according to the present invention.

Figure 2 is a side elevational view thereof on a larger scale, and

Figure 3 is a detail perspective view of the trip mechanism per se on a still larger scale.

Continuing with a more detailed description of the drawing, reference numeral 10 denotes a float which may be of any suitable design but is preferably of the type having a comparatively wide area exposed to the water to offer the greatest resistance to submergence.

Attached to the geometrical center of the float 10 is an upright 11 which has a double right angular bend in its upper end to provide an anchorage portion 12 for the upper end of a coil spring 13. The lower end of the spring is connected to the upper end of a bifurcated catch 14, having an expanded midsection defining a receptacle 15 to receive a protuberance 16 on the confronting face of the upright 11. A transverse pin $a$ extends through the receptacle 15 of catch 14 and engages under the protuberance 16, as seen in Figures 1 and 2 to thus hold the spring 13 under tension. A bolt 17 secures the protuberance 16 in fixed relation to the upright.

Pivoted at 18 in the bifurcated lower end of the catch 14 is a release trigger 19. This trigger has a beveled end 20 which bears against the face of the upright 11 immediately below the protuberance 16 when the device is set and to the opposite end of the trigger is attached the end of a fish line 21, which latter extends downwardly through a passage 22 in the float 10 and carries a fish hook 23 on its lower end.

When a fish takes the bait suspended on the hook 23, there is usually a tentative pull on the line 21 which is usually sufficient to rock the trigger arm 19 on its pivot 18 and when this occurs, the end 20 of the trigger will ride on the upright and urge the lower end of the catch 14 outwardly a distance sufficient to disengage its receptacle 15 from the protuberance 16 on the upright. The spring 13 instantly relaxes and jerks the line 21 and hook 23 upwardly with a force sufficient to set the hook in the mouth of the fish.

If the fisherman has not observed the agitation of the float 10 at the time of release of the catch 14, he has but to notice that the mechanism has been sprung to rebait his hook or to remove his catch and reset the mechanism.

The upper end of the upright 11 is equipped with means for attaching the device to a main fishing line 24 to which several more of the devices may be connected.

Manifestly, the construction as shown and described is capable of some modification and such modification as may be construed to fall within the scope and meaning of the appended claims is also considered to be within the spirit and intent of the invention.

What is claimed is:

1. An automatic jerking mechanism for fish hook lines comprising a float, an upright on said float adapted to be connected at its upper end to a main fishing line, a coil spring anchored at its upper end to said upright, a catch to which the lower end of said spring is attached, said catch being formed with a receptacle, a protuberance on said upright receivable by said receptacle to hold said spring under tension, a trigger arm pivoted to the lower end of said catch and having a beveled end bearing against said upright below said protuberance, and a fish hook line connected to the opposite end of said trigger arm, effective when pulled to rock said trigger on its pivot and disengage said catch from said protuberance and release the same to the action of said spring to exert a sudden upward jerk in said fish hook line.

2. An automatic jerking device for fishing lines comprising a float having substantially flat top and bottom surfaces, an upright mounted on the top surface of and disposed entirely above said float, a coil spring attached at one end adjacent the upper end of said upright, a catch connected to the opposite end of said spring, a protuberance adjacent the lower end of said upright on which said catch is releasably mounted to hold said spring under tension, a trigger arm pivoted to said catch, one end of which engages said upright below said protuberance, and a hook line connected to the opposite end of said trigger arm and extending downwardly through a passage in said float and adapted, when pulled downwardly to displace said trigger on its pivot and thereby release said catch to the action of said spring to exert a sudden upward pull on said fish hook line.

RAYMOND P. STALLINGS.

REFERENCES CITED

The following references are of record in the file of this patent:

UNITED STATES PATENTS

| Number | Name | Date |
| --- | --- | --- |
| 1,614,931 | Pennell | Jan. 18, 1927 |